July 3, 1956  H. C. WENDT  2,752,879
GYRO SPIN AXIS INDICATOR
Filed Nov. 6, 1953
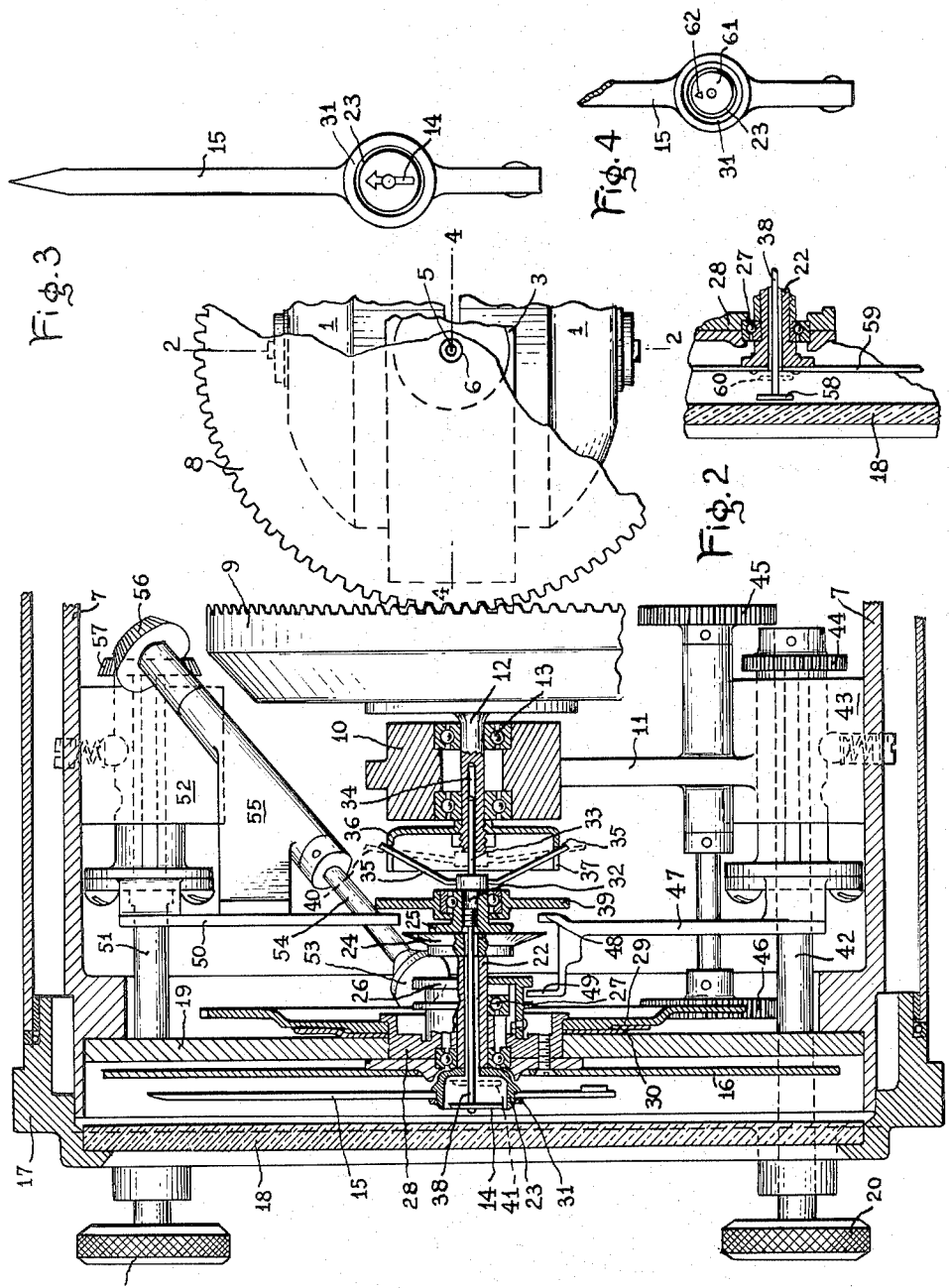
Inventor:
Harry C. Wendt
by Richard E. Hosley
His Attorney United States Patent Office 2,752,879
Patented July 3, 1956

2,752,879

GYRO SPIN AXIS INDICATOR

Harry C. Wendt, Lynn, Mass., assignor to General Electric Company, a corporation of New York Application November 6, 1953, Serial No. 390,491

5 Claims. (Cl. 116—129)

The present invention relates to gyroscopic apparatus and, more particularly, to improved directional gyroscopes having indicators characterizing the orientations of the gyro spin axes in relation to the outer frames of the gyroscopes.

In the copending application of Gabrielson et al. for "Gyro Setting Arrangement," Serial No. 386,488, filed October 16, 1953, and assigned to the same assignee as that of the present application, there is disclosed a universally-mounted directional gyroscope which is associated with azimuth indicator mechanisms which may be set and adjusted while fully decoupled from the gyroscope itself. Such arrangements possess the decided advantage of not reflecting precessing torques upon the gyroscope when setting or adjusting is performed, and, further, the need for caging equipment is obviated. However, the construction which permits the dial or pointer of a directional gyroscope to be entirely decoupled from the gyro output shaft and then to be coupled with it once more but at a different azimuth heading is one which makes it difficult to ascertain the azimuth position of the gyro spin axis; and it may be impossible to determine the spin axis orientation in those instruments which are fully encased and in which the indicators preclude a view of the gyroscope gimbals.

Knowledge of the whereabouts of the directional gyro spin axis in relation to the outer gyro case and supporting aircraft is particularly useful when bench testing or violent flight maneuvering is performed. Bench or laboratory tests of simulated loop, roll or other maneuvers are often specified in terms of a particular relationship of the spin axis to the gimbal lock positions, and it is also helpful to the pilot of an aircraft to know whether or not a maneuver on a specified azimuth heading will occasion gimbal lock or a gimbal stopping action. Further, certain instrument adjustments, such as balance adjustments, may be accomplished more satisfactorily when the relationship of the main gimbal and spin axis to the outer case is readily perceived. Prior instruments which possessed a dial or pointer permanently connected with the directional gyro output shaft afforded a clue as to the spin axis heading inasmuch as the relationships between the dial or pointer and the outer casing always characterized the relationships between the gyro spin axis and the outer casing. However, caging of such instruments was required before any azimuth indicator adjustment or setting could be realized. As appears more fully hereinafter, the instant invention provides a precision directional gyroscope including an indicator of spin axis heading which is independent of adjustable azimuth indicators and which reflects no precession torques upon the gyroscope.

Accordingly, it is one object of this invention to provide a novel and improved directional gyroscope having fully adjustable azimuth indicators and a gyro spin axis indicator.

Further, it is an object to provide a high precision directional gyroscope instrument in which the gyro output shaft is continuously coupled with a spin axis indicator and is selectably coupled with and decoupled from an angularly adjustable azimuth indicator.

By way of a summary account of one aspect of this invention, the azimuth sensing apparatus comprises a three-degree-of-freedom directional gyro assembly, including a rotor structure pivotally supported about minor and major axes, and gearing which angularly orients an output shaft to characterize the azimuth heading of the supporting craft in relation to the azimuth position of the gyro rotor spin axis. In association with the detecting apparatus is an independently adjustable mechanism for coupling the gyro output shaft with a hollow pointer shaft which rotates an azimuth pointer for reading against a dial plate bearing azimuth indicia. A first magnetic clutch element is affixed to the hollow pointer shaft, and a second magnetic clutch element is angularly fixed to a shaft intermediate the gyro output and pointer shafts. This intermediate shaft is mounted on the gyro output shaft, is collinear with and angularly fixed in relation to the gyro output shaft, and is axially movable and resiliently urged axially to bias the second clutch element into magnetic holding engagement with the first. The intermediate shaft is also provided with a slender extension which projects through the hollow pointer shaft and supports a small spin axis pointer within a cup-shaped hub on which the pointer shaft mounts the azimuth pointer. By virtue of this construction, the small spin axis pointer is in angular correspondence with the gyro output shaft at all times. Declutching of the pointer mechanism from the gyro output shaft for adjustment purposes is accomplished by manual actuation of a clutch throw-out assembly which moves the intermediate shaft axially in a rearward direction, whereupon the small spin axis pointer also moves in a rearward direction and is merely further recessed into the hub of the azimuth pointer where it continues to rotate in correspondence with the gyro output shaft.

Although the features of this invention which are believed to be novel are set forth in the appended claims, the details of preferred embodiments and further objects and advantages may be most readily comprehended by reference to the following description taken in connection with the accompanying drawings, wherein:

Figure 1 illustrates a partly-sectionalized view of a directional gyroscope constructed in conformity with the teachings of this invention, portions being broken away to reveal certain elements of the instrument;

Figure 2 is a partly-sectionalized top view of a portion of an alternative indicating assembly, the structure otherwise corresponding to that appearing in Figure 1; and Figures 3 and 4 represent front views of azimuth pointer and spin axis indicator constructions.

That arrangement for practicing this invention which appears in Figure 1 includes a directional gyroscope unit having rotor members 1 which are spun at high speed about a normally horizontal spin axis 2—2. The rotor structure, including electrical rotor motive means (not shown), is pivotally supported in vertical gimbal 3 about a horizontal minor axis 4—4, and the vertical gimbal 3 is pivotally supported about a vertical major axis 5 by journals, such as journal 6, which are rotatably mounted in the instrument frame 7. Although the rotor structure portrayed is that disclosed in my copending application, Serial No. 325,577, filed December 12, 1952, for "Symmetrical Gyroscope," assigned to the same assignee as that of the present application, other and conventional structure may be employed instead. The usual gimbal gear 8 is attached to gimbal 3 and is in a driving meshed relationship with a conventional unity-ratio cup-gear 9 which is revolubly supported by bearings in a hub 10 fixed with frame 7 by spacers 11. Cup-gear shaft 12 thus rotates in hub bearings 13 by angular amounts equal to the angular movements of the outer frame 7 in relation to the gimbal 3 and the gyro spin axis 2—2. Gimbal 3 and spin axis 2—2 are of course preserved in a set azimuth orientation by the gyroscopic inertia developed by rotor members 1.

The front-end or adjustable indicating mechanism of the instrument provides an indication of the spin axis heading by a small spin axis pointer 14 and also translates the angular orientations of the gyro output shaft 12 into angular orientations of an azimuth pointer 15 which is read against azimuth indicia appearing on a dial 16. Front flange 17 supports both a glass window 18, through which the dial and pointer may be viewed, and a front bracket 19 which provides bearing support for the angularly movable pointer 15 and adjustable dial 16. Each of the manually actuatable knobs 20 and 21 projects forward from the front flange 17 and is adapted for both axial and angular movement to accomplish certain decoupling and adjusting operations described later herein.

The adjusting operation performed by knob 20 is that of rotating both the pointer 15 and dial 16 simultaneously, such that the azimuth index representing the course being flown will be at a preferred position as seen by the observer. This adjustment cannot be effectuated until knob 20 has been pushed rearward axially, at which time the coupling between the gyro and azimuth pointer is completely severed while angular coupling between the gyro and spin axis pointer is undisturbed. Knob 21 may also be rotated to accomplish angular setting or adjustment of azimuth pointer 15 alone, and such pointer movement may likewise be accomplished only after knob 21 has been pushed rearward axially and has caused decoupling of the azimuth pointer from the gyro while having no effect upon the angular coupling between the gyro output shaft and spin axis pointer.

It should be noted that the hollow azimuth pointer shaft 22, which is affixed to the cup-shaped azimuth pointer hub 23 at its front end, is fastened to a permanently magnetized disk member 24 at its rearmost end. This magnetized disk member serves as a dual clutch element, in that its rear surface may be engaged in a holding relationship with the magnetic gyro clutch member 25 and in that its front surface may be engaged in a holding relationship with the magnetic dial clutch member 26. Azimuth pointer shaft 22 is rotatably mounted in the instrument by means of ball bearings 27 which are set in a bushing 28, that bushing being fitted in the front bracket 19. Dial plate 16 and setting gear 29 are affixed to a bushing 28 on opposite sides of front bracket 19, and a spring member 30 intermediate the setting gear 29 and bracket 19 frictionally restrains angular movement of the dial, bushing and setting gear in relation to the front bracket. Normally, the dial and setting gear unit is held stationary by spring member 20, although the azimuth pointer shaft is rotatable concentrically therewith in bearings 27. Azimuth pointer 15 moves with the azimuth pointer shaft 22, having been fixedly mounted on the exterior of cup-shaped hub 23 by some means such as a lock-nut 31. When magnetized clutch element 24 is engaged with gyro clutch member 25, the azimuth pointer 15 moves angularly with the gyro output shaft 12 and thereby indicates the azimuth orientation of the supporting craft.

Magnetic clutch member 25 is not directly attached to gyro output shaft 12, but is, instead, mounted on an intermediate shaft member 32 which is between and collinear with both the gyro output shaft 12 and the azimuth pointer shaft 22. Intermediate shaft 32 is wholly supported by the gyro output shaft 12, by virtue of the rear extension 33 which is slidable axially in the accommodating recess 34 in gyro output shaft 12. Rigid angular coupling between shafts 12 and 32 is provided by flat wire springs 35 which extend radially from intermediate shaft 32 and engage the cup-shaped coupler 36, attached to gyro output shaft 12, through narrow slots 37 in the coupler 36. This construction permits relative axial movement between shafts 12 and 32, thereby enabling declutching of member 25 from clutch member 24, while maintaining angular alignment between these shafts.

Because intermediate shaft 32 always rotates in angular correspondence with the gyro main gimbal 3 and spin axis 2—2, it is employed to actuate the small spin axis pointer 14 directly. The spin axis pointer 14 is small enough to rotate within the small cup-shaped azimuth pointer hub 23 where it is positioned on the end of the spin axis pointer shaft 38. It should be noted that this spin axis pointer shaft is fixed onto the front end of intermediate shaft 32, preferably comprising a slender integral extension thereof, and passes through the central openings of azimuth pointer shaft 22 and pointer hub 23 without frictional engagement. In some embodiments it may be desirable to provide a sensitive low-friction bearing between the spin axis pointer shaft 38 and hub 23 or azimuth pointer shaft 22, to afford further support, although this added bearing friction is preferably eliminated by dispensing with such a bearing.

Although the knob-actuated clutching and adjusting arrangement is more fully described in the aforementioned Gabrielson et al. application, its operation is also treated in some detail here because of the interrelationship between such arrangement and the spin axis indicator mechanism. Clutch decoupling through actuation of knobs 20 and 21 is facilitated by a clutch throw-out plate 39 which is mounted about the gyro clutch member 25 on low-friction bearings. When this throw-out plate is pressed rearwardly, it pulls the magnetic clutch member 25 out of engagement with magnetized clutch element 24 and causes it to slide back axially against the axial restraining force of springs 35. At such times, the springs 35 flex and spread outwardly through the slots 37 in cup member 36, and the shaft portion 33 slides further into recess 34 while preserving alignment between all the shafts. Pointer 15 or both that pointer and dial 16 may be angularly adjusted whenever such declutching is realized, without causing reflection of precessing torques upon the gyroscope. The upward deflection of springs 33, as it occurs during the declutched condition, is represented by dashed lines 40. The rearwardly recessed condition of the spin axis pointer 14 in the accommodating hollow hub 23, occasioned upon declutching and the attendant rearward axial movement of the spin axis pointer shaft 38, is represented by dashed lines 41.

A second magnetic clutching is provided, for coupling dial 16 angularly with azimuth pointer 15. For this purpose, the axially slidable dial clutch member 26 is angularly keyed onto the dial bushing 28, and, when the magnetic dial member 26 is pushed into holding engagement with the magnetized clutch member 24, the azimuth pointer 15 and dial 16 are angularly coupled. Angular adjustment of the position of both of these indicators is enabled by first pressing knob 20 rearwardly, whereupon knob shaft 42 slides axially in the frame bracket 43, carrying the attached gear 44 into mesh with gear 45 which turns with the gear 46 meshed with the dial gear 29. Before gears 44 and 45 mesh, however, the bifurcated clutch arm 47, which is axially movable with but angularly restrained independently of knob shaft 42, presses one of its branches 48 against the throw-out plate 39 to disengage the azimuth pointer shaft clutch member 24 and the gyro shaft clutch member 25, and then presses its other branch 49 against the rear side of an accommodating channel in dial clutch member 26 to cause the dial clutch member 26 to engage with the azimuth pointer clutch member 24. Thereafter, rotation of knob 20 causes simultaneous rotation of azimuth pointer 15 and azimuth dial 16.

Knob 21 also has a clutch throw-out arm, 50, which is angularly independent of but axially movable with its shaft 52, the latter being slidably mounted in a frame bracket 52. When knob 21 is pressed in, arm 50 presses against throw-out plate 39 to disengage the gyro shaft clutch member 25 from the azimuth pointer clutch member 24. Subsequent further inward movement of knob 20 carries the azimuth pointer drive wheel 53 into driving engagement with the azimuth pointer clutch member 24. This engagement occurs because the drive wheel shaft 54 is fixed in a support bracket 55 attached to the clutch arm 50 and thus moves with the clutch arm. Drive wheel shaft 54 is supported along an axis which is skewed in relation to the other instrument elements, the skewed setting being selected such that rearward movement of clutch arm 50 with knob 21 urges drive wheel 53 into a frictional driving engagement with the frustro-conical surface of clutch member 24. Bevel gear 56 attached to drive wheel shaft 54 is permanently enmeshed with gear 57 affixed to knob shaft 51, such that rotation of knob 21 may cause rotation of shaft 54, wheel 53, clutch member 24, and azimuth pointer 15. Dashed lines 41 and 40 also represent the condition of spin axis pointer 14 and springs 35 when knob 21 is pressed in to accomplish declutching. When knobs 20 and 21 are returned to the forward or outer positions illustrated, the other instrument parts also return to the positions shown.

In Figure 2 an alternative arrangement of azimuth indicator and spin axis indicator is depicted in association with other instrument parts which are the same as those in Figure 1 and which are correspondingly numbered. Azimuth indicator shaft 22 has no hub to receive the spin axis indicator 58, but merely possesses a bore through which the spin axis indicator shaft 36 passes without frictional interference. The azimuth indicator 59, which may be either a dial or pointer, is likewise simply provided with a central clearance opening. Spin axis indicator 58 may be a pointer or any suitably shaped or marked indicating member, and is positioned to move in front of azimuth indicator 59 between the illustrated position and the rearmost position shown by dashed lines 60.

Figure 3 shows a front view of the azimuth pointer, recessed hub, and spin axis pointer of Figure 1, and Figure 4 portrays a like view of an azimuth pointer cooperating with a circular spin axis dial 61 marked with an index 62 representing the gyro spin axis heading. The spin axis indicator is, in each instance, compared with the outer casing or frame or a stationary dial plate or other fixed instrument member to establish the spin axis orientation.

While particular embodiments of this invention have been shown and described herein, it will occur to those skilled in the art that various changes, modifications and substitutions may be effected without departing either in spirit or scope from the invention in its broadest aspects.

What I claim as new and desire to secure by Letters Patent of the United States is:

1. In a gyroscopic azimuth indicating instrument having an azimuth output shaft rotatable about an axis in an instrument frame, the azimuth indicating arrangement comprising an azimuth indicator, a hollow azimuth indicator shaft mounting said azimuth indicator for angular movement about said axis, a gyro spin axis indicator, a gyro spin axis indicator shaft angularly coupled with said azimuth output shaft about said axis, one of said azimuth indicator and spin axis indicator shafts being axially movable along said axis in relation to said azimuth output shaft, said spin axis indicator shaft projecting through said hollow azimuth shaft and mounting said spin axis indicator, clutch means having one clutch member fixed with said hollow azimuth indicator shaft and another clutch member fixed with said spin axis indicator shaft, means for moving said one of said shafts and its affixed clutch member axially along said axis in relation to said azimuth output shaft to cause angular coupling and uncoupling of said clutch members, and means for angularly adjusting said hollow azimuth indicator shaft when said clutch members are uncoupled.

2. In a gyroscopic azimuth indicating instrument having an azimuth output shaft rotatable about an axis in an instrument frame, the azimuth indicating arrangement comprising an azimuth indicator, a hollow azimuth indicator shaft mounting said azimuth indicator for angular movement about said axis, a substantially cup-shaped hub mounted on said hollow azimuth indicator shaft concentrically therewith and supporting said azimuth indicator, a spin axis indicator, a spin axis indicator shaft angularly coupled with said azimuth output shaft about said axis and axially movable in relation to said azimuth output shaft, said spin axis indicator shaft projecting through said hollow azimuth indicator shaft and said hub and supporting said spin axis indicator within said cup-shaped hub for rotation coaxially with said azimuth indicator, clutch means having one clutch member fixed with said hollow azimuth indicator shaft and another clutch member fixed with said spin axis indicator shaft, means for moving said spin axis indicator shaft and said other clutch member axially in relation to said azimuth output shaft to cause angular coupling and uncoupling of said clutch members, and means for angularly adjusting said hollow azimuth indicator shaft and said azimuth indicator when said clutch members are uncoupled.

3. In a gyroscopic azimuth indicating instrument having an azimuth output shaft rotatable about an axis in an instrument frame, the azimuth indicating arrangement comprising an azimuth indicator having a cylindrically recessed hub portion, a hollow azimuth indicator shaft mounting said azimuth indicator for rotation about said axis, a spin axis indicator, a spin axis indicator shaft angularly coupled with and supported by said azimuth output shaft, said spin axis indicator shaft projecting through said hollow azimuth indicator shaft and said azimuth indicator and supporting said spin axis indicator within said hub portion of said azimuth indicator for rotation coaxially therewith, one of said azimuth indicator and spin axis indicator shafts being mounted for axial movement along said axis in relation to said azimuth output shaft, clutch means having a first clutch member fixed with said hollow azimuth indicator shaft and a second clutch member fixed with said spin axis indicator shaft, means for moving said one of said shafts and its fixed clutch member axially along said axis to cause angular coupling and uncoupling of said clutch members, and means for angularly adjusting said azimuth indicator when said clutch members are uncoupled.

4. In a gyroscopic azimuth indicating instrument having an azimuth output shaft mounted in an instrument frame for rotation about an axis, the azimuth indicating arrangement comprising an azimuth indicator, a hollow azimuth indicator shaft mounted in said frame for rotation about said axis and supporting said azimuth indicator, a spin axis indicator small in size in relation to said azimuth indicator, a spin axis indicator shaft, means supporting said spin axis indicator shaft on said azimuth output shaft such that relative angular movement therebetween is precluded and such that axial movement of said spin axis indicator shaft is permitted along said axis, said spin axis indicator shaft projecting through said hollow azimuth indicator shaft and supporting said small spin axis indicator in proximity with said azimuth indicator, a first clutch member angularly fixed in relation to said azimuth indicator shaft, a second clutch member angularly fixed in relation to said spin axis indicator shaft and movable axially therewith, means resiliently urging said second clutch member axially into engagement with said first clutch member to couple said output and azimuth indicator shafts angularly, means for moving said spin axis indicator shaft axially along said axis to declutch said clutch members, and means for adjusting said azimuth indicator angularly when said clutch members are declutched.

5. In a gyroscopic azimuth indicating instrument having an azimuth output shaft mounted in an instrument frame for rotation about an axis, the azimuth indicating arrangement comprising an azimuth indicator, a hollow azimuth indicator shaft mounted in said frame for rotation about said axis and supporting said azimuth indicator, a spin axis indicator small in size in relation to said azimuth indicator, a spin axis indicator shaft projecting through said hollow azimuth indicator shaft along said axis and supporting said spin axis indicator in proximity with said azimuth indicator, a first clutch member angularly fixed in relation to said azimuth indicator shaft, a second clutch member angularly fixed in relation to said spin axis indicator shaft and movable axially therewith along said axis, a transversely-slotted coupling member attached to said azimuth output shaft, transversely-extending coupling spring means attached to said spin axis indicator shaft and engaging said coupling member through the slots therein, said coupling spring means having angular rigidity about and flexibility in directions parallel with said axis and biasing said second clutch member axially into engagement with said first clutch member, means for moving said spin axis indicator shaft axially against the force of said coupling spring means to declutch said clutch members, and means for adjusting said azimuth indicator angularly when said clutch members are declutched.

References Cited in the file of this patent

UNITED STATES PATENTS

| | | |
|---|---|---|
| Re. 22,409 | Lyman et al. | Dec. 21, 1943 |
| 2,470,482 | Gabrielson | May 17, 1949 |
| 2,506,885 | Noxon | May 9, 1950 |
| 2,572,827 | Adkins et al. | Oct. 30, 1951 |
| 2,590,780 | Lynch | Mar. 25, 1952 |
| 2,593,509 | West | Apr. 22, 1952 |
| 2,677,120 | Konet | Apr. 27, 1954 |

FOREIGN PATENTS

| | | |
|---|---|---|
| 652,051 | Great Britain | Apr. 18, 1951 |